US012626643B2

(12) United States Patent
Bae et al.

(10) Patent No.: US 12,626,643 B2
(45) Date of Patent: May 12, 2026

(54) DISPLAY DEVICE AND REPAIRING METHOD THEREOF

(71) Applicant: Samsung Display Co., LTD., Yongin-si (KR)

(72) Inventors: Joon Woo Bae, Yongin-si (KR); Guanghai Jin, Yongin-si (KR); Dong Min Lee, Yongin-si (KR); Samtae Jeong, Yongin-si (KR)

(73) Assignee: Samsung Display Co., LTD, Gyeonggi-Do (KR)

( * ) Notice: Subject to any disclaimer, the term of this patent is extended or adjusted under 35 U.S.C. 154(b) by 0 days.

(21) Appl. No.: 18/758,536

(22) Filed: Jun. 28, 2024

(65) Prior Publication Data

US 2025/0201171 A1 Jun. 19, 2025

(30) Foreign Application Priority Data

Dec. 19, 2023 (KR) ........................ 10-2023-0185929

(51) Int. Cl.
*G09G 3/32* (2016.01)
*G09G 3/00* (2006.01)

(52) U.S. Cl.
CPC ............... *G09G 3/32* (2013.01); *G09G 3/006* (2013.01); *G09G 2330/08* (2013.01); *G09G 2380/02* (2013.01)

(58) Field of Classification Search
CPC ...... G09G 3/32; G09G 3/006; G09G 2330/08; G09G 2380/02
See application file for complete search history.

(56) References Cited

U.S. PATENT DOCUMENTS

2017/0316737 A1* 11/2017 Park ..................... G09G 3/3208
2018/0293936 A1 10/2018 Fujioka
2024/0420623 A1* 12/2024 Lee ...................... H10H 29/142

FOREIGN PATENT DOCUMENTS

CN 107204357 9/2017
KR 10-2019-0068826 6/2019
KR 10-2248464 5/2021
KR 10-2022-0042003 4/2022

* cited by examiner

*Primary Examiner* — Antonio Xavier
(74) *Attorney, Agent, or Firm* — Harness, Dickey & Pierce, P.L.C.

(57) ABSTRACT

A display device includes a first display area including a plurality of pixels arranged repetitively. Each of the plurality of pixels in the first display area includes a light emitting diode, a first pixel circuit, and a second pixel circuit adjacent to the first pixel circuit, and in at least one first pixels included in the plurality of pixels, the light emitting diode is electrically connected to the first pixel circuit and insulated from the second pixel circuit.

18 Claims, 16 Drawing Sheets

DISPLAY DEVICE AND REPAIRING METHOD THEREOF

CROSS-REFERENCE TO RELATED APPLICATION(S)

This application claims priority to and the benefit of Korean Patent Application No. 10-2023-0185929 under 35 U.S.C. § 119, filed on Dec. 19, 2023, in the Korean Intellectual Property Office, the entire contents of which are incorporated herein by reference.

BACKGROUND

1. Technical Field

This disclosure relates to a display device and a repair method for the display device.

2. Description of the Related Art

Display devices such as liquid crystal displays (LCD) and organic light emitting diode displays (OLED displays) include a display panel including a plurality of pixels capable of displaying images.

Each pixel includes a pixel electrode that receives a data signal, and the pixel electrode is connected to a pixel circuit including at least one transistor to receive a data signal.

Each pixel may include a light emitting area, which is an area capable of emitting light.

Recently, deformable display devices that can change their shape, such as by bending or folding the panel, have been developed.

For example, the display device may include at least a portion of a deformable region that can be bent.

SUMMARY

In areas where the display device is deformed, the pixel circuit receives more stress, making it prone to defects, and if a defect in the pixel circuit occurs, a defect may occur in the light emitting element connected to the corresponding pixel circuit, which may cause defects such as dark spots or bright spots in the image.

Embodiments are intended to provide a structure and method for repairing a defect in a pixel of a deformable display device.

According to an embodiment, a display device may include a first display area including a plurality of pixels repetitively arranged. Each of the plurality of pixels in the first display area may include a light emitting diode, a first pixel circuit, and a second pixel circuit adjacent to a side of the first pixel circuit. In at least one first pixel included in the plurality of pixels, the light emitting diode may be electrically connected to the first pixel circuit and insulated from the second pixel circuit.

Each of the plurality of pixels may include a first transistor and a second transistor connected to the first transistor, and the second transistors of the first pixel circuit included in each of the plurality of pixels and the second transistor of the second pixel circuit may be connected to a same data line and a same scan line.

In at least one second pixel of the plurality of pixels, the light emitting diode may be insulated from the first pixel circuit and electrically connected to the second pixel circuit.

The light emitting diode may include a pixel electrode. In the at least one second pixel, the first pixel circuit may be electrically connected to a first portion of a first connection part, the second pixel circuit may be electrically connected to a second connection part, the pixel electrode may be electrically connected to a second portion of the first connection part that is separated from and facing the first portion of the first connection part, and the second connection part and the third connection part may overlap each other in a plan view and may be electrically connected to each other.

At least one of the first connection part, the second connection part, and the third connection part may include a metal.

The light emitting diode may include a pixel electrode. In the at least one first pixel, the first pixel circuit may be electrically connected to a first connection part, the second pixel circuit may be electrically connected to a second connection part, the pixel electrode may be electrically connected to the first connection part and a third connection part spaced apart from the first connection part, and the second connection part and the third connection part may overlap each other in a plan view and insulated from each other.

At least one of the first connection part, the second connection part, and the third connection part may include a metal.

The display device may further include a second display area including a plurality of second pixels. Each of the plurality of second pixels in the second display area may include a second light emitting diode and a third pixel circuit electrically connected to the second light emitting diode.

The display device may further include a deformable region of which at least a part can be deformed, and at least one non-deformable region connected to the deformable region. The deformable region may include the first display area, and the at least one non-deformable region may include the second display area.

A display device according to an embodiment may include a first portion that is deformable and a second portion that is connected to the first portion and is less deformable than the first portion. The first part may include a plurality of first pixels, the second part may include a plurality of second pixels, each of the plurality of second pixels may include a first light emitting diode and a pixel circuit electrically connected to the first light emitting diode, each of the plurality of first pixels may include a second light emitting diode and a plurality of pixel circuits, and in each of the plurality of first pixels, the second light emitting diode may be electrically connected to only one of the plurality of pixel circuits.

The plurality of pixel circuits included in each of the plurality of first pixels may be connected to a same signal line.

Each of the plurality of first pixels and the plurality of second pixels may include a first transistor and a second transistor connected to the first transistor, and the second transistor in the plurality of pixel circuits included in each of the plurality of first pixels may be connected to a same data line and a same scan line.

Each of the first and second light emitting diodes may include a pixel electrode, and each of the plurality of pixel circuits in each of the plurality of first pixels may include a first pixel circuit and a second pixel circuit adjacent to each other. In at least one of the plurality of first pixels, the first pixel circuit may be electrically connected to a first connection part, the second pixel circuit may be electrically connected to a second connection part, the pixel electrode may be connected to the first connection part and a third connection part spaced apart from the first connection part, and the second connection part and the third connection part may overlap each other in a plan view and may be insulated from each other.

At least one of the first connection part, the second connection part, and the third connection part may include a metal.

Each of the first and second light emitting diodes may include a pixel electrode, and each of the plurality of pixel circuits included in each of the plurality of first pixels may include a first pixel circuit and a second pixel circuit adjacent to each other. In at least one of the plurality of first pixels, the first pixel circuit may be electrically connected to a first portion of a first connection part, the second pixel circuit may be electrically connected to a second connection part, the pixel electrode may be electrically connected to a second portion of the first connection part that is separated from and facing the first portion of the first connection part, and a third connection part that is spaced apart from the first connection part, and the second connection part and the third connection part may overlap each other in a plan view and be electrically connected to each other.

At least one of the first connection part, the second connection part, and the third connection part may include a metal.

A repair method of a display device according to an embodiment may include, in a display device including a first display area including a plurality of pixels, wherein each of the plurality of pixels in the first display area may include a light emitting diode, a first pixel circuit, and a second pixel circuit adjacent to the first pixel circuit, disconnecting an electrical connection between the light emitting diode and the first pixel circuit and electrically connecting the light emitting diode with the second pixel circuit, in at least one first pixel included in the plurality of pixels.

Each of the plurality of pixels may include a first transistor and a second transistor connected to the first transistor, and the second transistor of the first pixel circuit included in each of the plurality of pixels and the second transistor of the second pixel circuit may be connected to a same data line and a same scan line.

The light emitting diode may include a pixel electrode. In the at least one first pixel, the first pixel circuit may be electrically connected to a first portion of a first connection part, the second pixel circuit may be electrically connected to a second connection part, the pixel electrode may be electrically connected to a second portion of the first connection part that is separated from and facing the first portion of the first connection part, and a third connection part that is spaced apart from the first connection part, and the second connection part and the third connection parts may overlap each other in a plan view and be electrically connected to each other.

The repair method may further include using a laser, in the disconnecting of the light emitting diode and the first pixel circuit and the electrically connecting of the light emitting diode to the second pixel circuit may use a laser.

According to embodiments, in case that a defect occurs in a pixel of a deformable display device, the display defect can be solved by repairing the pixel.

DETAILED DESCRIPTION OF THE EMBODIMENTS

Figure 1:
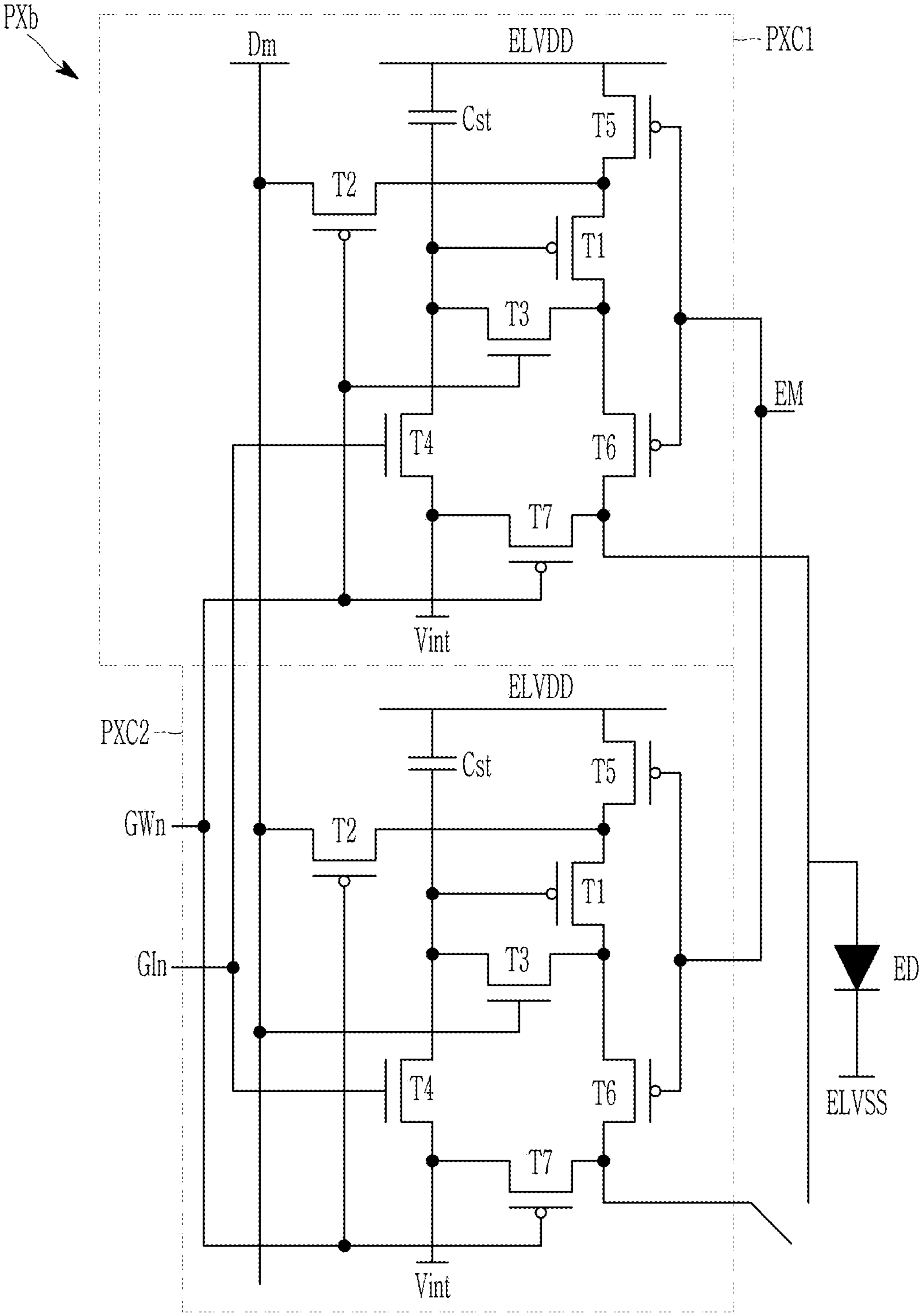
FIG. 1 is a schematic diagram of an equivalent circuit of a pixel of a display device according to an embodiment.

Hereinafter, with reference to the attached drawings, various embodiments of the disclosure will be described in detail so that those skilled in the art can easily implement the disclosure.

The disclosure may be implemented in many different forms and is not limited to the embodiments described herein.

In order to clearly explain the disclosure, parts that are not relevant to the description are omitted, and identical or similar components are assigned the same reference numerals throughout the specification.

In addition, the size and thickness of each component shown in the drawings are arbitrarily shown for convenience of explanation, so the disclosure is not necessarily limited to that which is shown.

In the drawing, the thickness is enlarged to clearly express various layers and regions.

And in the drawings, for convenience of explanation, the thicknesses of some layers and regions are exaggerated.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In the specification and the claims, the phrase "at least one of" is intended to include the meaning of "at least one selected from the group of" for the purpose of its meaning and interpretation. For example, "at least one of A and B" may be understood to mean "A, B, or A and B." In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In addition, throughout the specification, when reference is made to "on a plane" of "in a plan view", this means when the target portion is viewed from above, and when reference is made to "in a cross-section" or "in a cross-sectional view", this means when a cross-section of the target portion is cut vertically and viewed from the side.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

A display device according to an embodiment will now be described with reference to FIGS. 1 and 2.

Figure 2:
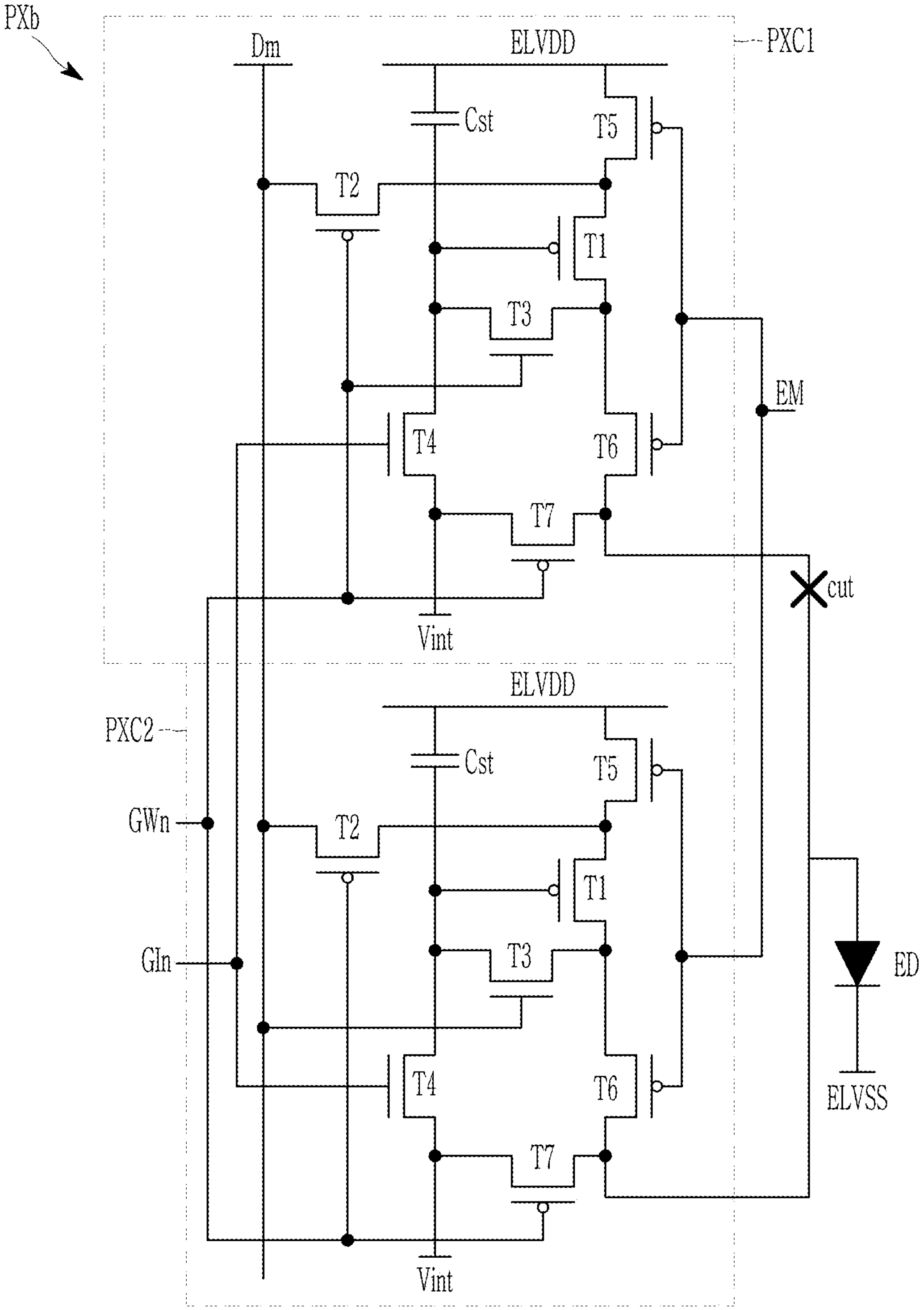
FIG. 2 is a schematic diagram of an equivalent circuit of a repaired pixel of a display device according to an embodiment.

FIG. 1 is a schematic diagram of an equivalent circuit of a pixel of a display device according to an embodiment, and FIG. 2 is a schematic diagram of an equivalent circuit of a repaired pixel of a display device according to an embodiment.

Referring to FIG. 1, a display device according to an embodiment may include a display area, and the display area may include multiple pixels that are units capable of displaying an image.

Pixels may be repeatedly arranged in the display area and may include a pixel PXb including a pixel circuit as shown in FIG. 1 or FIG. 2.

Each of the pixels PXb included in the display device according to one embodiment may include a light emitting diode ED, a first pixel circuit PXC1, and a second pixel circuit PXC2.

Each of the first pixel circuit PXC1 and the second pixel circuit PXC2 may include multiple transistors (T1, T2, T3, T4, T5, T6, T7) and a capacitor (Cst).

The configuration of the first pixel circuit PXC1 and the second pixel circuit PXC2 may be the same as shown in FIGS. 1 and 2 or may have different circuit configurations.

The first pixel circuit PXC1 and the second pixel circuit PXC2 included in one pixel PXb may be arranged adjacent to each other.

The light emitting diode ED of one pixel PXb may be electrically connected to either the first pixel circuit PXC1 or the second pixel circuit PXC2 to receive a data signal.

FIG. 1 shows a state in which a light emitting diode ED of a pixel PXb is electrically disconnected from a second pixel circuit PXC2 and is electrically connected to a first pixel circuit PXC1, and FIG. 2 shows a state in which a light emitting diode ED of a pixel PXb is electrically disconnected from the first pixel circuit PXC1 and is electrically connected to the second pixel circuit PXC2.

Transistors (T1, T2, T3, T4, T5, T6, T7) included in each of the first pixel circuit PXC1 and the second pixel circuit PXC2 may be the first transistor T1, the second transistor T2, a third transistor T3, a fourth transistor T4, a fifth transistor T5, a sixth transistor T6, and a seventh transistor T7.

Each transistor (T1, T2, T3, T4, T5, T6, T6) may have a gate terminal that can receive a gate-on voltage and a gate-off voltage that can turn the transistor on/off, a first terminal that may be a source terminal, and a second terminal that may be a drain terminal.

The gate terminal of the first transistor T1 may be connected to an end of the capacitor Cst, the first terminal of the first transistor T1 may be connected to the drive voltage line that can transmit the drive voltage ELVDD via the fifth transistor T5, and the second terminal of the first transistor T1 may be connected to the anode of the light-emitting diode ED via the sixth transistor T6.

The first transistor T1 may receive the data signal Dm according to the switching operation of the second transistor T2 and supply a driving current to the light emitting diode ED.

The data signal Dm may have a voltage level depending on the image signal input to the display device.

The gate terminal of the second transistor T2 may be connected to a scan line that transmits the scan signal GWn, the first terminal of the second transistor T2 may be connected to a data line that transmits the data signal Dm, and the second terminal of the second transistor T2 may be connected to the first terminal of the first transistor T1 and a driving voltage line capable of transmitting the driving voltage ELVDD via the fifth transistor T5.

The second transistor T2 may be turned on according to the scan signal GWn and may transmit the data signal Dm transmitted from the data line to the first terminal of the first transistor T1.

The second transistor T2 of the first pixel circuit PXC1 included in one pixel PXb and the second transistor T2 of the second pixel circuit PXC2 may be connected to a same data line and receive a same data signal Dm.

The second transistor T2 of the first pixel circuit PXC1 included in one pixel PXb and the second transistor T2 of the second pixel circuit PXC2 may be connected to a same scan line and receive a same scan signal GWn.

The gate terminal of the third transistor T3 may be connected to a scan line capable of transmitting the scan signal GWn, and the first terminal of the third transistor T3 may be connected to the second terminal of the first transistor T1 and the anode of the light emitting diode ED via the sixth transistor T6.

The second terminal of the third transistor T3 may be connected to the second terminal of the fourth transistor T4, an end of the capacitor Cst, and the gate terminal of the first transistor T1.

The third transistor T3 may be turned on according to the scan signal GWn and may connect the gate terminal and the second terminal of the first transistor T1 to each other to diode-connect the first transistor T1.

The third transistor T3 of the first pixel circuit PXC1 and the third transistor T3 of the second pixel circuit PXC2 included in one pixel PXb may be connected to a same scan line and receive a same scan signal GWn.

The gate terminal of the fourth transistor T4 may be connected to a scan line capable of transmitting the scan signal GIn, the first terminal of the fourth transistor T4 may be connected to the initialization voltage Vint terminal, and the second terminal of the fourth transistor T4 may be connected to an end of the capacitor Cst and the gate terminal of the first transistor T1 via the second terminal of the third transistor T3.

The fourth transistor T4 may be turned on according to the scan signal GIn and may transfer the initialization voltage Vint to the gate terminal of the first transistor T1, initializing the voltage of the gate terminal of the first transistor T1.

The fourth transistor T4 of the first pixel circuit PXC1 and the fourth transistor T4 of the second pixel circuit PXC2 included in one pixel PXb may be connected to a same scan line and receive a same scan signal Gin.

The scan signal Gin and the scan signal GWn may transmit the gate-on voltage at different timing.

For example, if the scan signal GWn is the (n)th scan signal Sn (n is a natural number of 1 or more) among the scan signals applied during one frame, the scan signal GIn may be the (n−1)th scan signal, and a front-end scan signal such as S(n−1).

The gate terminal of the fifth transistor T5 may be connected to a control line that can transmit a control signal EM that can control the light emission of the light emitting diode ED, the first terminal of the fifth transistor T5 may be connected to a drive voltage line that can transmit a drive voltage ELVDD, and the second terminal of the fifth transistor T5 may be connected to the first terminal of the first transistor T1 and the second terminal of the second transistor T2.

The control signal EM may transmit a gate-on voltage and a gate-off voltage.

The gate terminal of the sixth transistor T6 may be connected to the control line that transmits the control signal EM, and the first terminal of the 6th transistor T6 may be connected to the second terminal of the first transistor T1 and the first terminal of the third transistor T3, and the second terminal of the sixth transistor T6 may be electrically connected to the anode of the light emitting diode ED.

The fifth transistor T5 and the sixth transistor T6 may be turned on simultaneously according to the control signal EM, and through this, the drive voltage ELVDD may be compensated through the diode-connected first transistor T1 and may be delivered to the light emitting diode ED.

The fifth transistor T5 and sixth transistor T6 of the first pixel circuit PXC1 included in one pixel PXb and the fifth transistor T5 and sixth transistor T6 of the second pixel circuit PXC2 may be connected to a same control line and can receive a same control signal EM.

The gate terminal of the seventh transistor T7 may be connected to a scan line capable of transmitting the scan signal GWn, the first terminal of the seventh transistor T7 may be connected to the second terminal of the sixth transistor T6 and the anode of the light emitting diode ED, and the second terminal of the seventh transistor T7 may be connected to the initialization voltage Vint and the first terminal of the fourth transistor T4.

The gate terminal of the seventh transistor T7 may receive a scan signal having a timing different from the scan signal GWn.

The seventh transistor T7 of the first pixel circuit PXC1 included in a pixel PXb and the seventh transistor T7 of the second pixel circuit PXC2 may be connected to a same scan line and receive a same scan signal GWn.

The transistors (T1, T2, T3, T4, T5, T6, T7) may be P-type channel transistors such as PMOS, but the disclosure is not limited thereto, and at least one of the transistors (T1, T2, T3, T4, T5, T6, T7) may be an N-type channel transistor.

FIG. 1 and FIG. 2 show embodiments that the transistors T3 and T4 are N-type channel transistors.

As described above, an end of the capacitor Cst may be connected to the gate terminal of the first transistor T1, and another end is connected to the driving voltage ELVDD.

The cathode of the light emitting diode ED may be connected to a common voltage terminal capable of transmitting the common voltage ELVSS and may receive the common voltage ELVSS.

The corresponding transistors (T2, T3, T4, T5, T6, T7) of the first pixel circuit PXC1 and the second pixel circuit PXC2 included in the pixel PXb according to one embodiment may receive a same scan signal (GWn, GIn), data signal Dm, and driving voltage ELVDD.

The structure of the first pixel circuit PXC1 and the second pixel circuit PXC2 included in the pixel PXb is not limited to the structure shown in FIGS. 1 and 2 and depends on the number of transistors and capacitors, and numbers and connection relationships may be modified in various ways.

The pixel PXb of the display device in a normal state may emit light in case that the light emitting diode ED is connected to the first pixel circuit PXC1 as shown in FIG. 1, but in case that a defect occurs in the first pixel circuit PXC1 as shown in FIG. 2, the electrical connection path with the first pixel circuit PXC1 may be cut and the light emitting diode ED may be connected to the second pixel circuit PXC2 instead, so that the light emitting diode ED may emit light normally.

This process is called repair of the pixel PXb, and the state shown in FIG. 2 is called a repaired state.

A laser may be used to cut the electrical connection path between the first pixel circuit PXC1 and the light emitting diode ED, and the electrical connection between the second pixel circuit PXC2 and the light emitting diode ED may also be done using a laser.

This repair method for the pixel PXb will be described with reference to FIGS. 3 to 6 along with FIGS. 1 and 2 described above.

Figure 3:
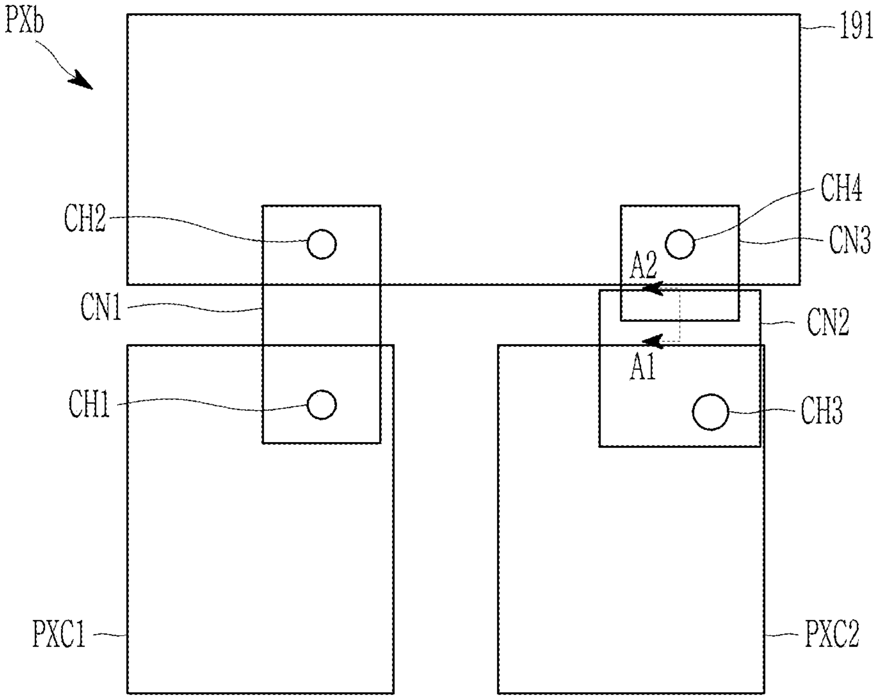
FIG. 3 is a top view of one pixel of a display device according to one embodiment.
Figure 4:
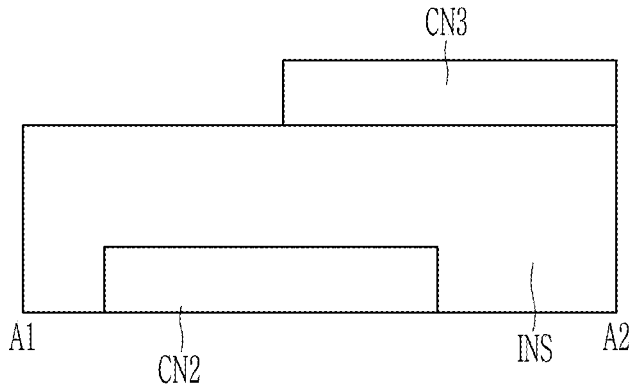
FIG. 4 is a schematic cross-sectional view of the display device shown in FIG. 3 taken along line A1-A2.
Figure 5:
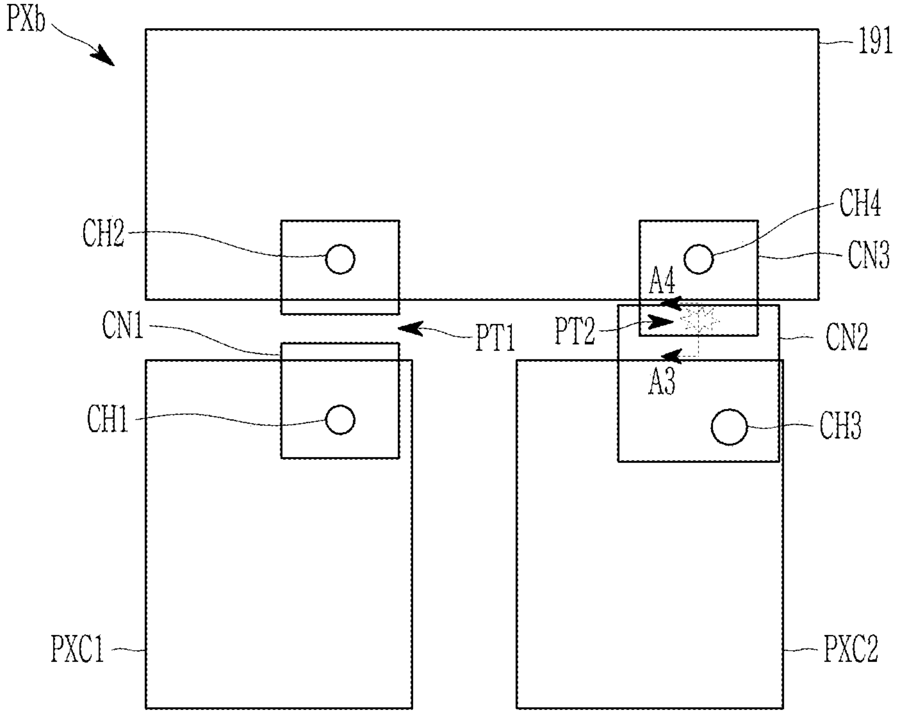
FIG. 5 is a plan view of one repaired pixel of a display device according to an embodiment.
Figure 6:
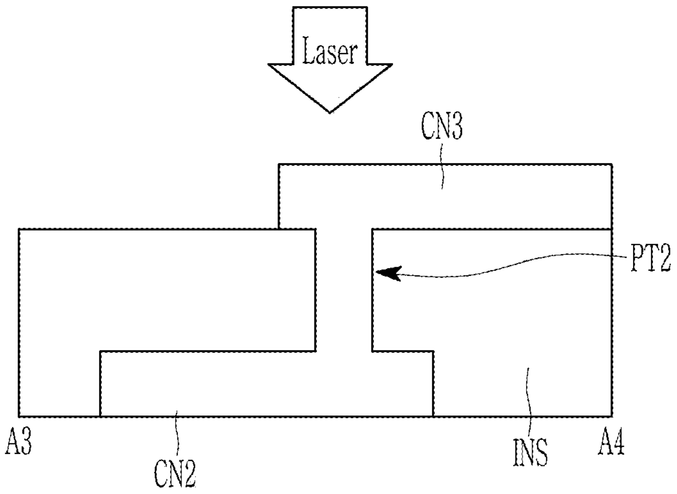
FIG. 6 is a schematic cross-sectional view of the display device shown in FIG. 5 taken along line A3-A4.

FIG. 3 is a top view of one pixel of a display device according to an embodiment, FIG. 4 is a schematic cross-sectional view of the display device shown in FIG. 3 taken along line A1-A2, FIG. 5 is a plan view of one repaired pixel of a display device according to an embodiment, and FIG. 6 is a schematic cross-sectional view of the display device shown in FIG. 5 taken along line A3-A4.

Referring to FIGS. 3 and 5, the light emitting diode ED included in the pixel PXb of the display device according to one embodiment may include a pixel electrode 191 that may serve as an anode.

Referring to FIG. 3, in a normal state, the pixel electrode 191 may be electrically connected to the first pixel circuit PXC1 to receive a data voltage, and the electrical connection may be made through the first connection part CN1, which is a conductor.

The first connection part CN1 may be electrically connected to a terminal of the first pixel circuit PXC1 through the contact hole CH1 and may be electrically connected to the pixel electrode 191 through the contact hole CH2.

Unlike as shown in FIG. 3, in another embodiment, the first connection part CN1 and a terminal of the first pixel circuit PXC1 may be located on a same layer or may be an extended part, and the contact hole CH1 may be omitted.

In another embodiment, the first connection part CN1 and the pixel electrode 191 may be located on a same layer or may be an extended portion, and the contact hole CH2 may be omitted.

Referring to FIGS. 3 and 4, in a normal state, the pixel electrode 191 may be electrically insulated from the second pixel circuit PXC2.

A terminal of the second pixel circuit PXC2 may be electrically connected to the second connection part CN2, which is a conductor, through the contact hole CH3, and the pixel electrode 191 may be electrically connected to the third connection part CN3, which is a conductor insulated from the second connection part CN2, through the contact hole CH4.

The third connection part CN3 may be spaced apart from the first connection part CN1.

The second connection part CN2 and the third connection part CN3 may overlap each other in a plan view, and referring to FIG. 4, the second connection part CN2 and the third connection part CN3 may be located in different conductive layers, and an insulating layer (INS) may be located between them.

Unlike as shown in FIG. 3, in another embodiment, the second connection part CN2 and a terminal of the second pixel circuit PXC2 may be located on a same layer or may be an extended portion, and the contact hole CH3 may be omitted.

In another embodiment, the third connection part CN3 and the pixel electrode 191 may be located on a same layer or may be an extended portion, and the contact hole CH4 may be omitted.

Referring to FIG. 5, in an abnormal state in which a defect occurs in the first pixel circuit PXC1, the pixel electrode 191 may be electrically insulated from the first pixel circuit PXC1 and electrically connected to the second pixel circuit PXC2 and receive the data voltage.

In an embodiment, the first connection part CN1 may be completely cut at the first point PT1 so that the first connection part CN1 includes two parts that are separated from each other and face each other, and the second connection part CN2 connected to the second pixel circuit PXC2 and the third connection part CN3 overlapping the second connection part CN2 may be connected to each other at the second point PT2, so that the pixel electrode 191 may be electrically connected to the second pixel circuit PXC2 and receive the data voltage.

The first point PT1 may be an inner part of the first connection part CN1, and the second point PT2 may be a part where the second connection part CN2 and the third connection part CN3 overlap each other in a plan view.

The first connection part CN1 may be cut using a laser, and the second connection part CN2 and the third connection part CN3 may be physically and electrically connected to each other using a laser as shown in FIG. 6.

In this way, in case that a defect occurs in a pixel, the display defect can be easily solved through repair as shown in FIGS. 5 and 6.

The structure and repair method of a display device will be described with reference to FIGS. 7 to 10 along with FIGS. 1 to 6 described above.

Figure 7:
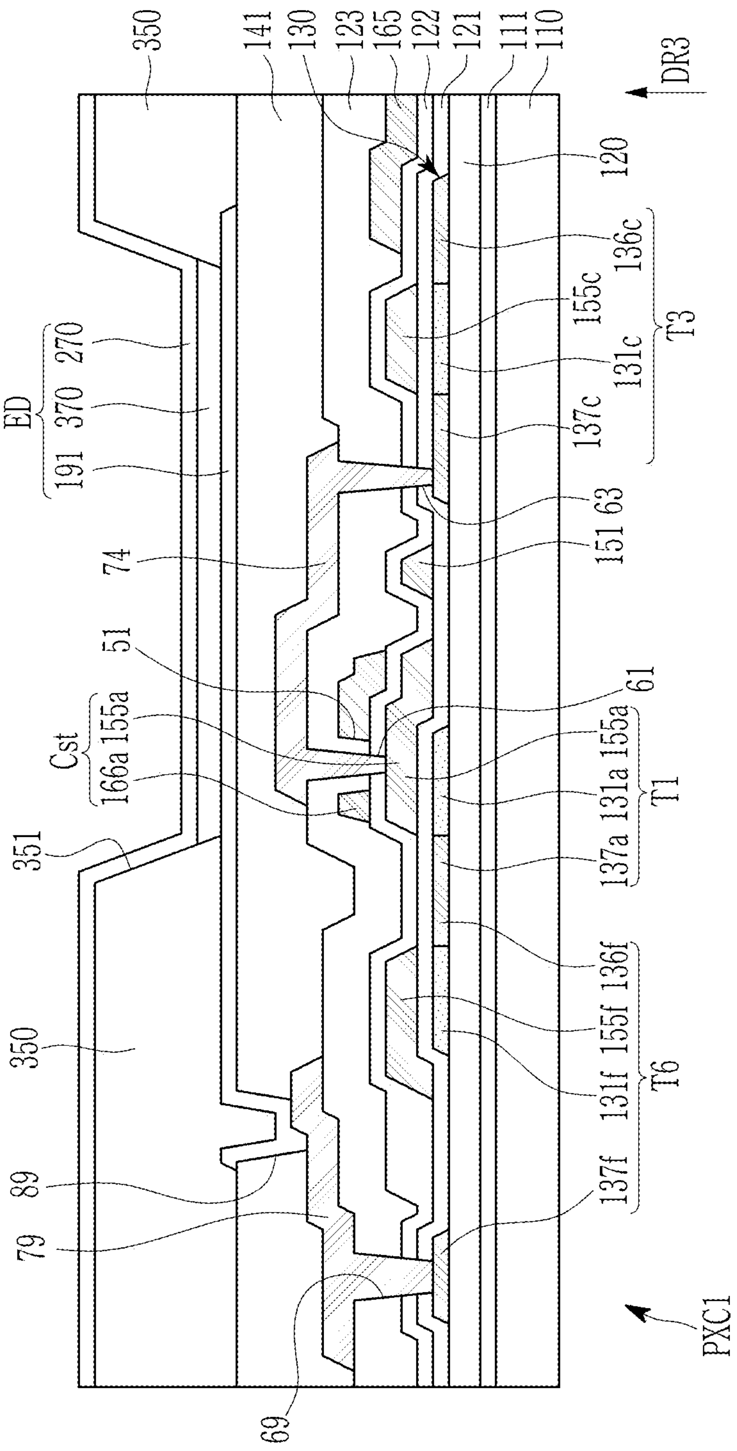
FIG. 7 is a schematic cross-sectional view of a first pixel circuit portion of one pixel of a display device according to an embodiment.
Figure 8:
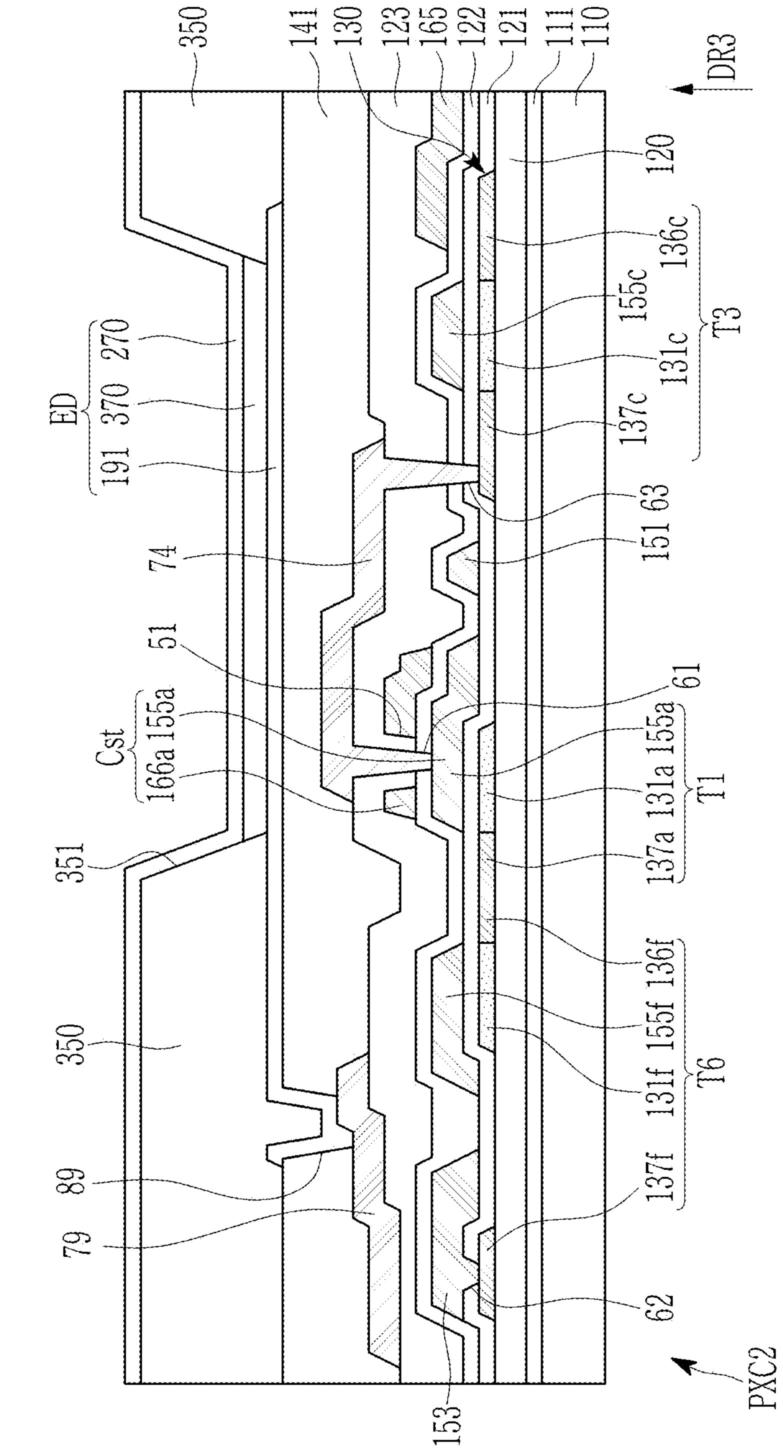
FIG. 8 is a schematic cross-sectional view of a second pixel circuit portion of one pixel of a display device according to an embodiment.
Figure 9:
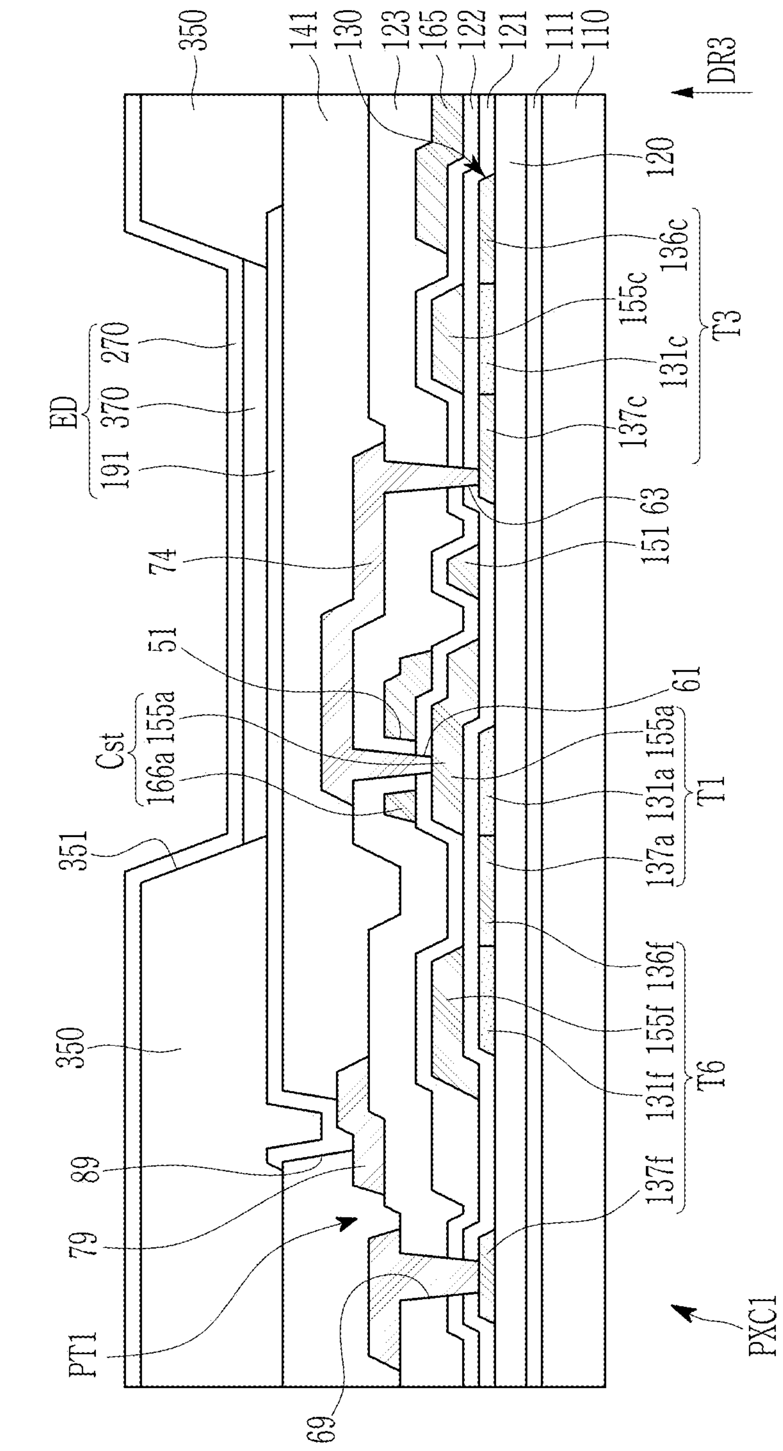
FIG. 9 is a schematic cross-sectional view of a first pixel circuit portion of one pixel of a display device according to an embodiment.
Figure 10:
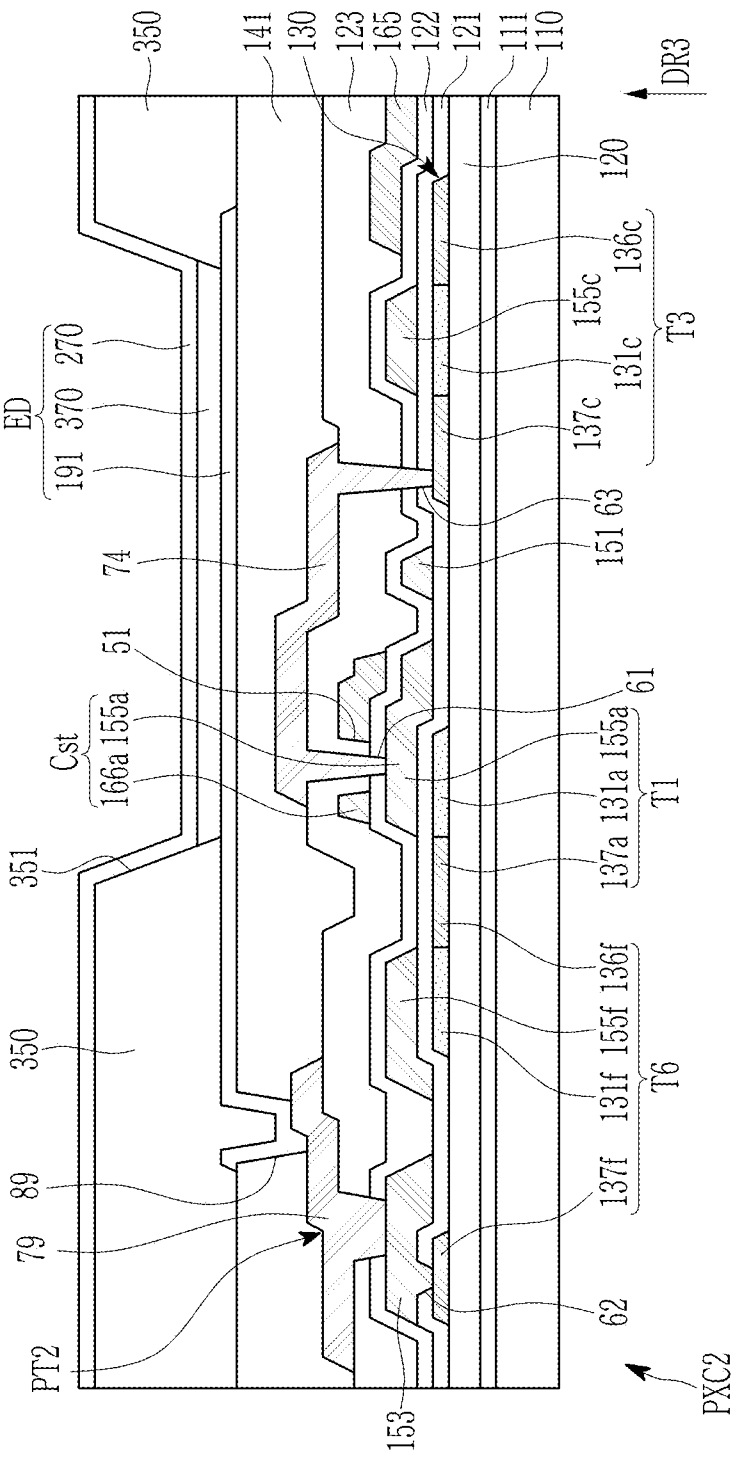
FIG. 10 is a schematic cross-sectional view of a second pixel circuit portion of one pixel of a display device according to an embodiment.

FIG. 7 is a schematic cross-sectional view of a first pixel circuit portion of a pixel of a display device according to an embodiment, FIG. 8 is a schematic cross-sectional view of a second pixel circuit portion of a pixel of a display device according to an embodiment, FIG. 9 is a schematic cross-sectional view of a first pixel circuit portion of a pixel of a display device according to an embodiment, and FIG. 10 is a schematic cross-sectional view of a second pixel circuit portion of a pixel of a display device according to an embodiment.

The pixel in FIGS. 7-10 may be the pixel PXb described above.

Referring to FIGS. 7 and 8, a display device according to an embodiment may include a substrate 110, a barrier layer 111, which is an insulating layer, may be positioned on the substrate 110, and a buffer layer, which is an insulating layer, may be positioned on the barrier layer 111.

At least one of the barrier layer 111 and the buffer layer 120 may be omitted.

The active pattern 130 may be located on the buffer layer 120.

The active pattern 130 may include channel regions 131*a*, 131*c*, and 131*f* that form channels for each of the transistors T1, T2, T3, T4, T5, T6, and T7 described above, and conductive regions 136*c* 136*f*, 137*a*, 137*c*, 137*f* at ends.

The first and second terminals of each transistor described above may include conductive regions located on sides of each channel region 131*a*, 131*c*, and 131*f*.

The active pattern 130 may include amorphous silicon, polycrystalline silicon, or an oxide semiconductor.

A first insulating layer 121 may be located on the active pattern 130, and a first conductive layer may be located on the first insulating layer 121.

The first conductive layer may include the scan line and control line described above, the driving gate electrode 155*a*, and the gate electrodes 155*c* and 155*f*.

Referring to FIG. 8, the first conductive layer located in the second pixel circuit PXC2 may further include a conductor 153.

A second insulating layer 122 may be located on the first conductive layer and the first insulating layer 121, and a second conductive layer may be located on the second insulating layer 122.

The second conductive layer may include a storage part 166*a* that overlaps the driving gate electrode 155*a* in a plan view.

A third insulating layer 123 may be positioned on the second conductive layer and the second insulating layer 122.

At least one of the barrier layer 111, the buffer layer 120, the first insulating layer 121, the second insulating layer 122, and the third insulating layer 123 may include inorganic insulating materials and/or organic insulating materials such as a silicon oxide, a silicon nitride, a silicon nitride, or an aluminum oxide.

Some or all of the first insulating layer 121, the second insulating layer 122, and the third insulating layer 123 may include multiple contact holes 61, 62, 63, and 69.

A third conductive layer may be located on the third insulating layer 123.

The third conductive layer may include multiple connection members 74 and 79, a data line, and a driving voltage line.

The first transistor T1 may include a channel region 131*a*, a first conductive region, a second conductive region 137*a*, and a driving gate electrode 155*a*.

The driving gate electrode 155*a* may be electrically connected to the connection member 74 through the contact hole 61.

The contact hole 61 may be located in the hole 51 included in the storage unit 166*a*.

The third transistor T3 may include a channel region 131*c*, a first conductive region 136*c*, a second conductive region 137*c*, and a gate electrode 155*c*.

The second conductive region 137*c* may be connected to the connection member 74 through the contact hole 63.

The sixth transistor T6 may include a channel region 131*f*, a first conductive region 136*f*, a second conductive region 137*f*, and a gate electrode 155*f*.

The first conductive region 136*f* may be connected to the second conductive region 137*a* of the first transistor T1.

As shown in FIG. 7, the second conductive region 137*f* of the first pixel circuit PXC1 may be connected to the connection member 79 through the contact hole 69, and as shown in FIG. 8, the second conductive region 137*f* of the second pixel circuit PXC2 may be connected to the conductor 153 through the contact hole 62.

In the second pixel circuit PXC2, the conductor 153 and the connection member 79 may overlap each other in a plan view and be insulated from each other, and the second insulating layer 122 and the third insulating layer 123 may be interposed between the conductor 153 and the connection member 79.

In the first pixel circuit PXC1, the connection member 79 may correspond to the first connection part CN1 described in FIG. 3, and in the second pixel circuit PXC2, the conductor 153 may correspond to the second connection part CN2 in FIG. 3, while the connection member 79 may correspond to the third connection part CN3.

The capacitor Cst may include a driving gate electrode 155*a* and a storage unit 166*a* as two terminals that overlap each other in a plan view, and the second insulating layer 122 may be interposed between the driving gate electrode 155*a* and the storage unit 166*a*.

At least one of the first conductive layer, the second conductive layer, and the third conductive layer may include at least one metal such as copper (Cu), aluminum (Al), magnesium (Mg), silver (Ag), gold (Au), platinum (Pt), palladium (Pd), nickel (Ni), neodymium (Nd), iridium (Ir), molybdenum (Mo), tungsten (W), titanium (Ti), chromium (Cr), tantalum (Ta), an alloy thereof, etc.

A fourth insulating layer 141 may be located on the third conductive layer.

The fourth insulating layer 141 may include an inorganic insulating material and/or an organic insulating material such as a polyimide, an acrylic polymer, or a siloxane polymer.

A pixel electrode layer may be positioned as a fourth conductive layer on the fourth insulating layer 141.

The pixel electrode layer may include a pixel electrode 191.

The pixel electrode layer may include a semi-transmissive conductive material or a reflective conductive material, or may include metal.

The pixel electrode 191 may be connected to the connection member 79 through the contact hole 89 of the fourth insulating layer 141 and may receive a data voltage.

A fifth insulating layer 350 (also referred to as a pixel defining layer) may be located on the fourth insulating layer 141.

The fifth insulating layer 350 may have an opening 351 located above the pixel electrode 191.

The fifth insulating layer 350 may include an organic insulating material such as a polyacrylic resin or a polyimide resin.

A light emitting layer 370 may be located on the pixel electrode 191.

The light emitting layer 370 may include a portion located in the opening 351 of the fifth insulating layer 350.

The light emitting layer 370 may include an organic light emitting material or an inorganic light emitting material.

A common electrode 270 may be located on the light emitting layer 370.

The common electrode 270 may also be formed on the fifth insulating layer 350 and continuously formed across multiple pixels.

The common electrode 270 may include a conductive transparent material.

The pixel electrode 191, the light emitting layer 370, and the common electrode 270 together may form a light emitting diode ED, and one of the pixel electrode 191 and the common electrode 270 may be a cathode, and another one of the pixel electrode 191 and the common electrode 270 may be an anode.

In the normal state, a pixel electrode 191 of a pixel may be electrically connected to the sixth transistor T6 of the first pixel circuit PXC1 through a connection member 79 as shown in FIG. 7, and may receive a data voltage, and as shown in FIG. 8, the pixel electrode 191 may be insulated from the second pixel circuit PXC2.

Referring to FIG. 9, in case that a defect occurs in the first pixel circuit PXC1, the connection member 79 of the first pixel circuit PXC1 may cut at the first point PT1, which is the inner portion, using a laser or the like to cut the pixel electrode 191 and may be insulated from the sixth transistor T6 of the first pixel circuit PXC1.

As shown in FIG. 10, a laser or the like may be applied to the second point PT2, where the connection member 79 and the conductor 153 overlap each other in a plan view, to physically connect the connection member 79 to the conductor 153 so they may be electrically connected.

According to this repair, the pixel electrode 191 may be connected to the sixth transistor T6 of the normal second pixel circuit PXC2.

The structure and repair method of a display device will be described with reference to FIGS. 11 to 14 along with FIGS. 1 to 10 described above.

Figure 11:
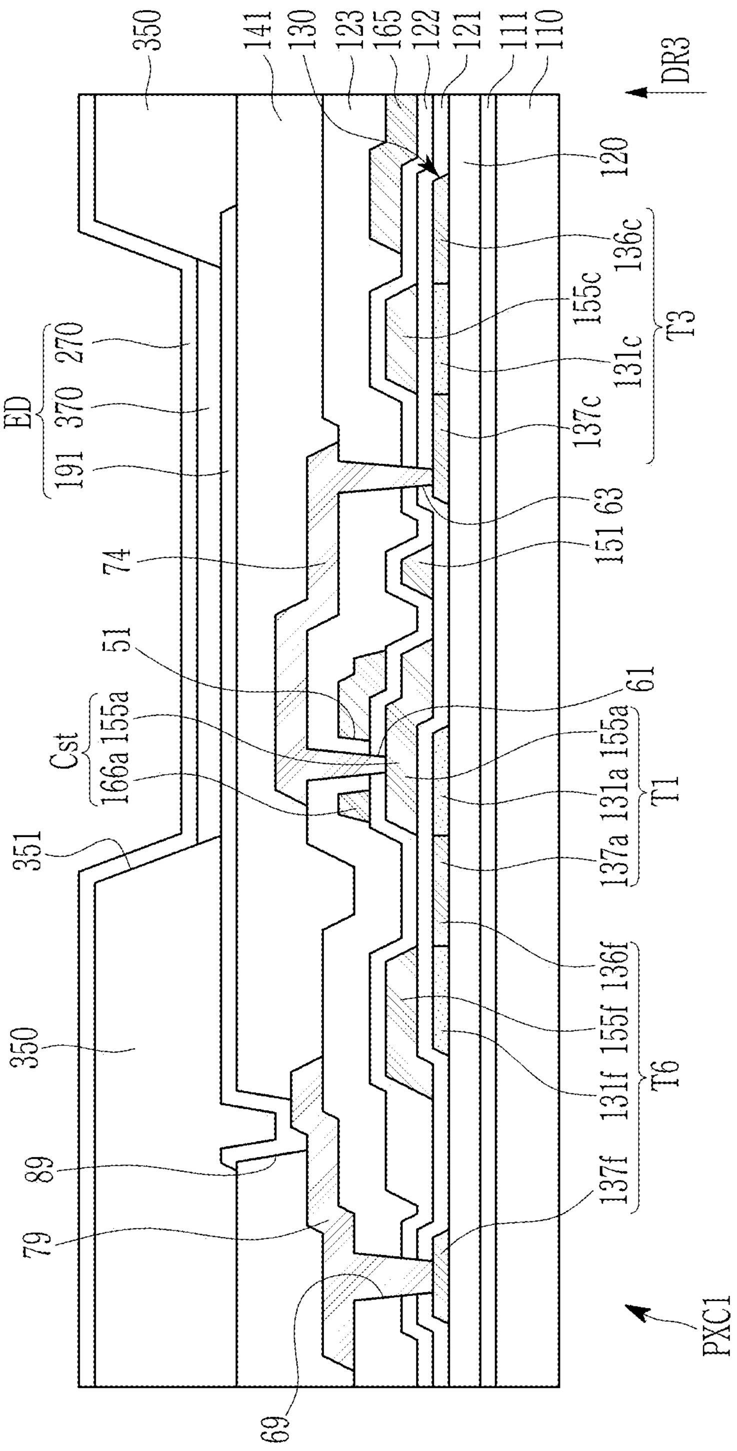
FIG. 11 is a schematic cross-sectional view of a first pixel circuit portion of one pixel of a display device according to an embodiment.
Figure 12:
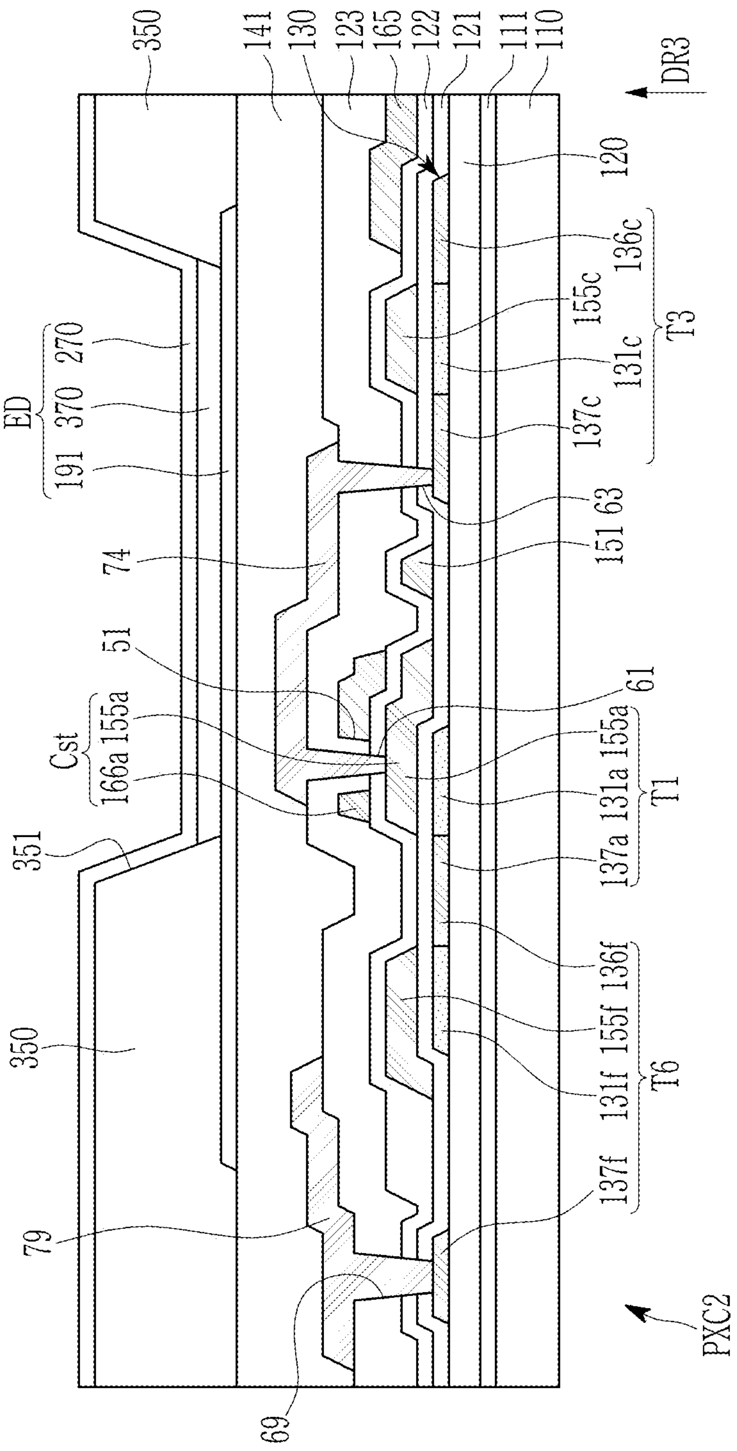
FIG. 12 is a schematic cross-sectional view of a second pixel circuit portion of one pixel of a display device according to an embodiment.
Figure 13:
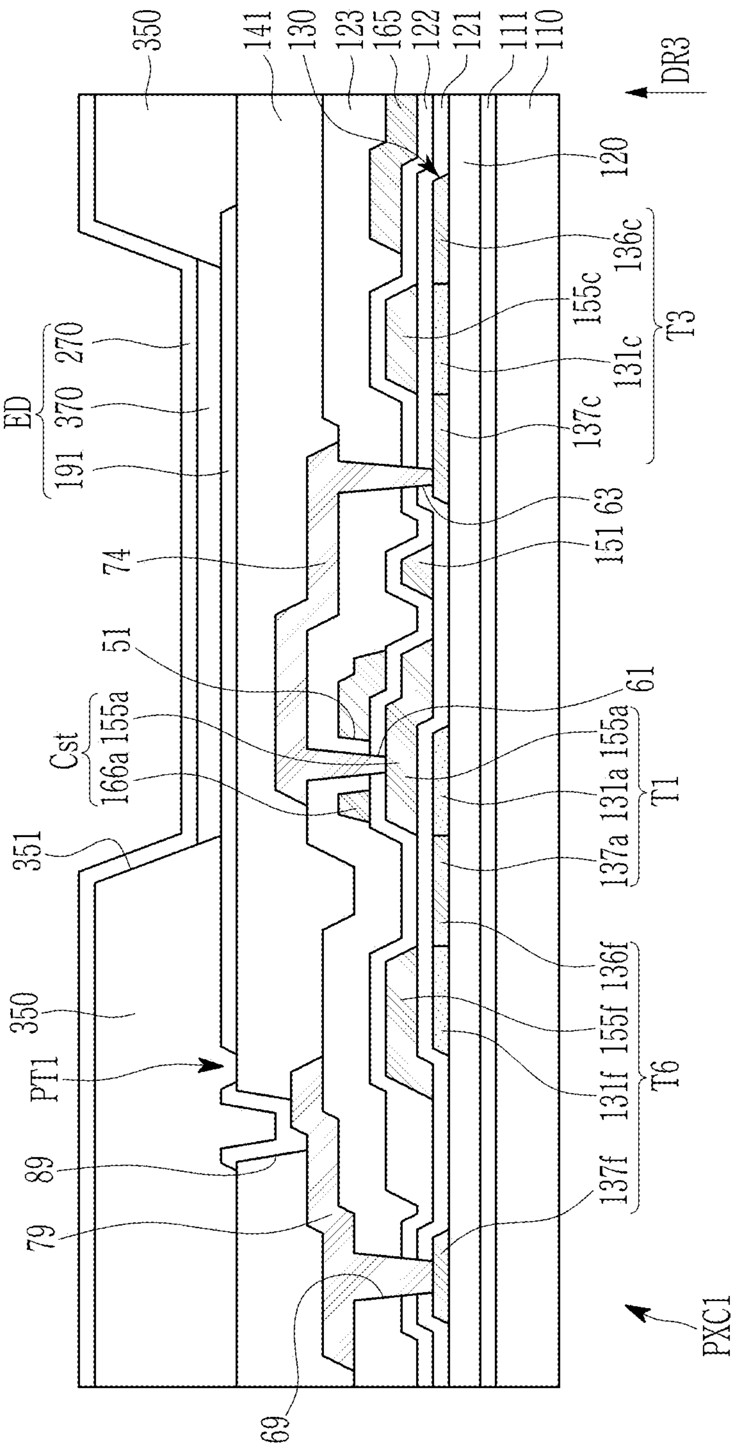
FIG. 13 is a schematic cross-sectional view of a first pixel circuit portion of one pixel of a display device according to an embodiment.
Figure 14:
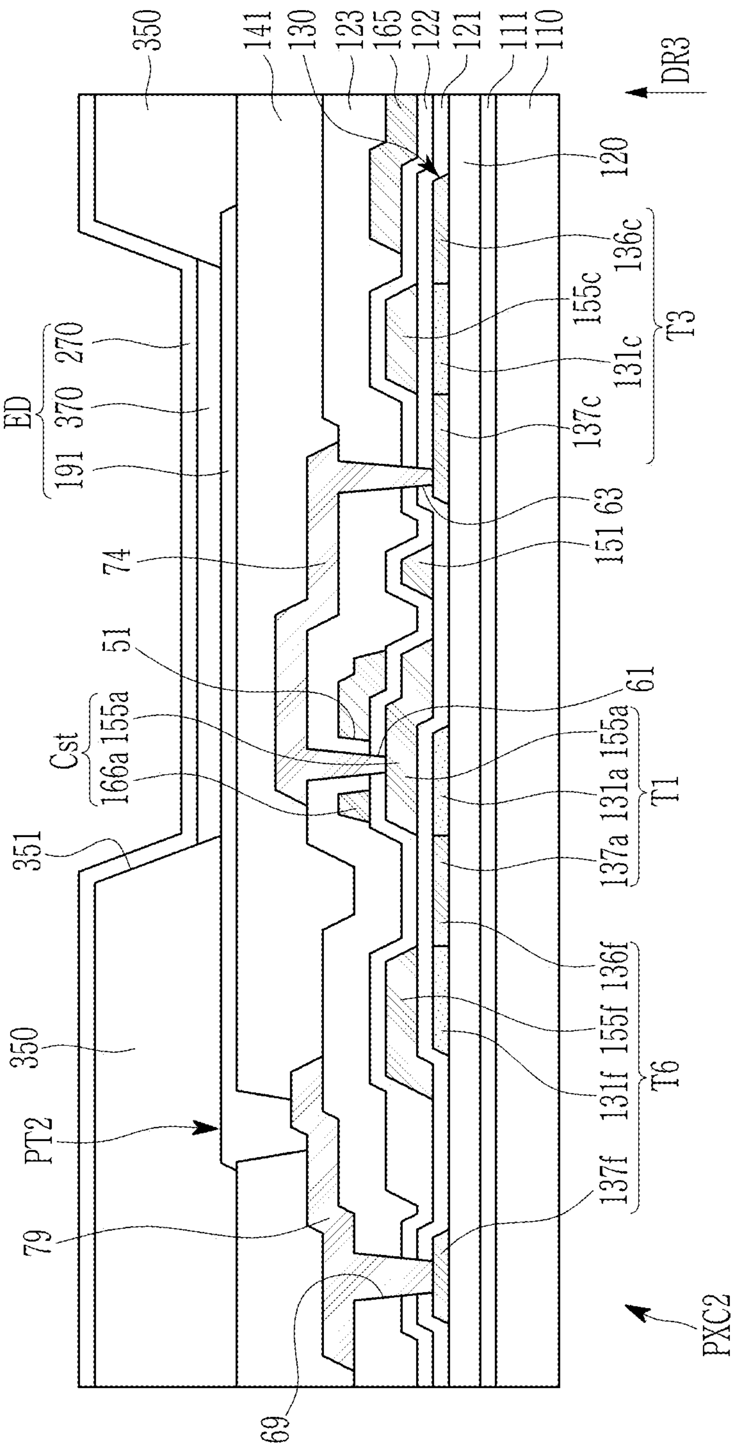
FIG. 14 is a schematic cross-sectional view of a second pixel circuit portion of one pixel of a display device according to an embodiment.

FIG. 11 is a schematic cross-sectional view of a first pixel circuit portion of one pixel of a display device according to an embodiment, FIG. 12 is a schematic cross-sectional view of a second pixel circuit portion of one pixel of a display device according to an embodiment, and FIG. 13 is a schematic cross-sectional view of a first pixel circuit portion of one pixel of a display device according to an embodiment, and FIG. 14 is a schematic cross-sectional view of a second pixel circuit portion of one pixel of a display device according to an embodiment.

The display device according to an embodiment shown in FIGS. 11 to 14 may be similar to the structure of the display device shown in FIGS. 7 to 10, but different in that, in a normal state, the second conductive region 137*f* of the sixth transistor T6 in the second pixel circuit PXC2 may be connected to the connection member 79 through the contact hole 69, and the pixel electrode 191 may be insulated from the connection member 79 with the fourth insulation layer 141 between the pixel electrode 191 and the connection member 79.

A portion of the pixel electrode 191 in the first pixel circuit PXC1 may correspond to the first connection part CN1 of FIG. 3 described above, and the connection member 79 in the second pixel circuit PXC2 may correspond to the first connection part CN1 of FIG. 3. A portion of the pixel electrode 191 that corresponds to the connection part CN2 and overlaps the connection member 79 in a plan view may correspond to the third connection part CN3.

In a normal state, a pixel electrode 191 of a pixel may be electrically connected to a 6th transistor T6 of a first pixel circuit PXC1 through a connection member 79 as shown in FIG. 11, and may receive a data voltage. As shown in FIG. 12, the pixel electrode 191 may be insulated from the second pixel circuit PXC2.

Referring to FIG. 13, in case that a defect occurs in the first pixel circuit PXC1, the light emitting diode may be cut off at the first point PT1, which is the inner part of the pixel electrode 191 of the first pixel circuit PXC1, using a laser, etc., and a portion of the pixel electrode 191 forming ED may be insulated from the sixth transistor T6 of the first pixel circuit PXC1.

As shown in FIG. 14, a laser or the like may be applied to the second point PT2, where the pixel electrode 191 and the connection member 79 overlap each other in a plan view, to physically connect the pixel electrode 191 to the connection member 79 so they may be electrically connected.

According to this repair, the pixel electrode 191 may be connected to the sixth transistor T6 of the normal second pixel circuit PXC2.

A display device according to an embodiment will be described with reference to FIGS. 15 and 16 along with the previously described drawings.

Figure 15:
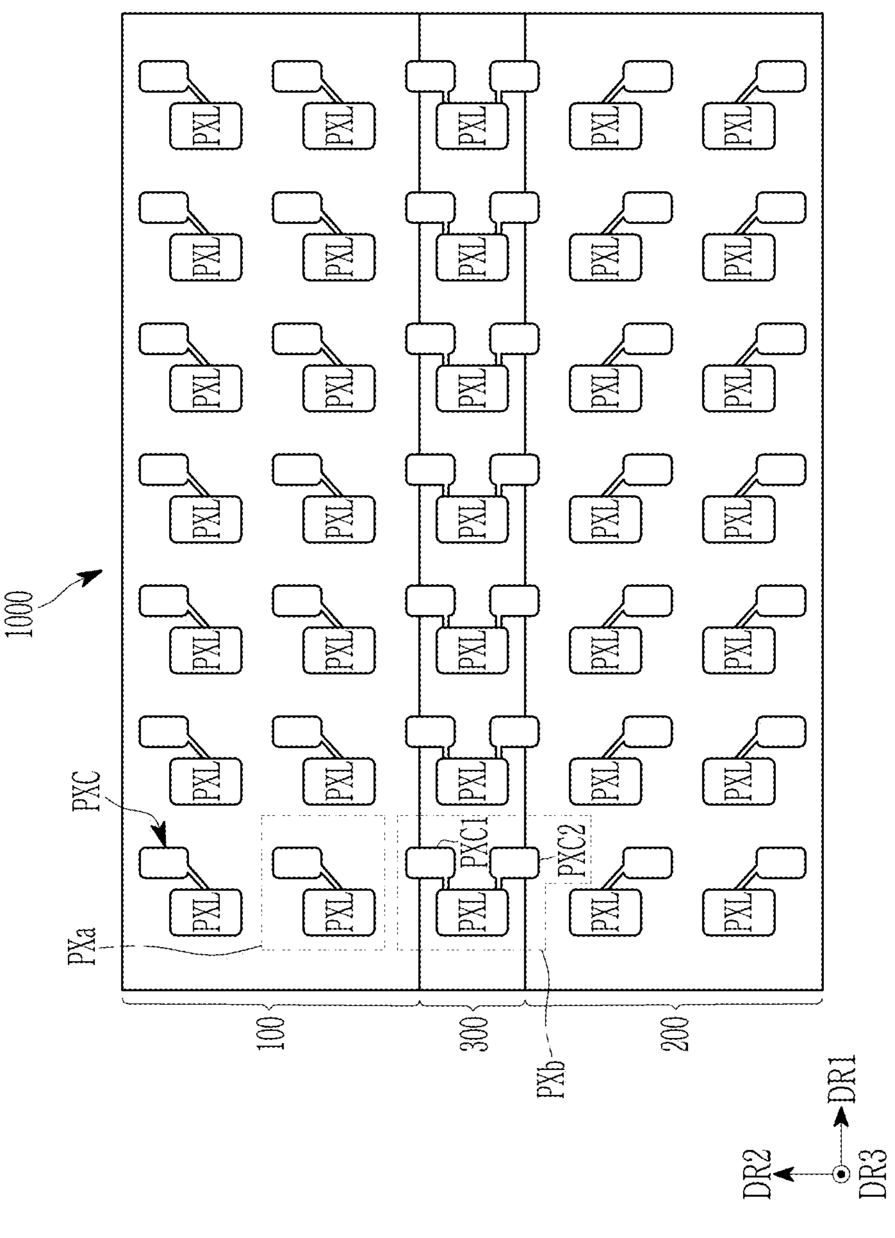
FIG. 15 is a plan view of the display device in an unfolded state according to one embodiment.
Figure 16:
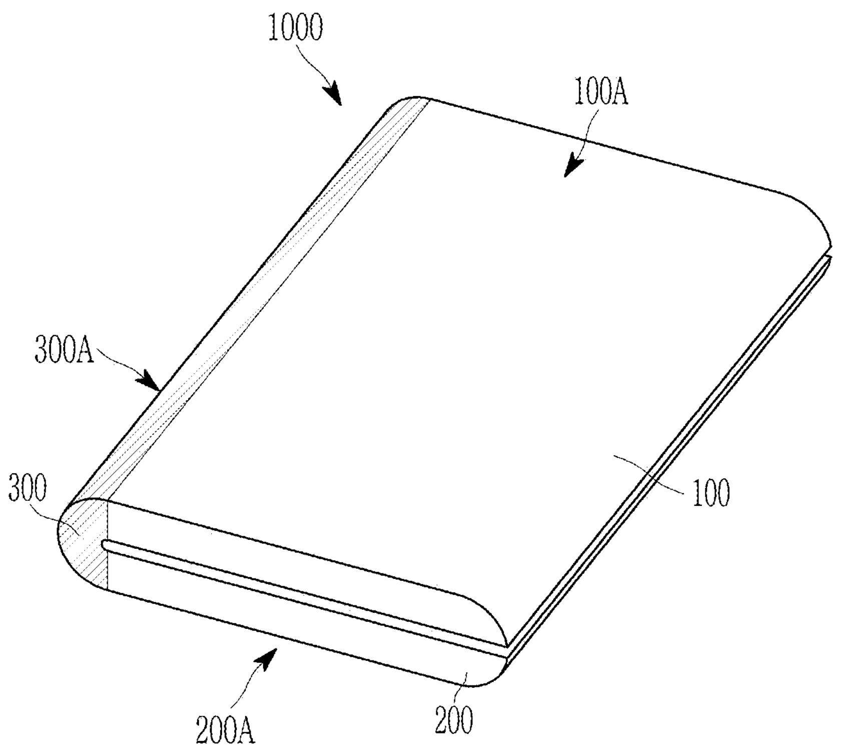
FIG. 16 is a plan view of the display device in a folded state according to one embodiment.

FIG. 15 is a plan view of a display device according to an embodiment in an unfolded state, and FIG. 16 is a plan view of a display device according to an embodiment in a folded state.

Referring to FIGS. 15 and 16, the display device according to one embodiment may be a deformable display device whose shape can be changed, such as by bending or folding at least a portion of the display device.

For example, a display device 1000 according to an embodiment may include a deformable region 300 that can be deformed, such as at least part may be bent, and at least one non-deformable region 100, 200 connected to the deformable region 300.

FIGS. 15 and 16 schematically illustrate an embodiment in which the display device 1000 according to an embodiment includes non-deformable regions 100 and 200 facing each other with a deformable region 300 between the non-deformable regions 100 and 200.

The non-deformable regions 100 and 200 may be relatively less deformed or have a completely fixed shape compared to the deformable region 300.

For example, the deformable region 300 may be a bending area, and the non-deformable regions 100 and 200 may be non-bending areas that do not bend.

The deformable region 300 and the non-deformable regions 100 and 200 may include a display area capable of displaying an image including pixels.

The non-deformable regions 100 and 200 may include multiple pixels PXa, and the deformable region 300 may include multiple pixels PXb.

In the non-deformable regions 100 and 200, the pixels PXa may be generally arranged in a matrix form in a plan view, but the disclosure is not limited thereto, and the pixels PXa may be arranged repeatedly according to various rules.

In the deformable region 300, the pixels PXb may be generally arranged in a matrix form in a plan view parallel to the first direction DR1 and the second direction DR2, but the disclosure is not limited thereto, and pixels PXb may be arranged repeatedly with various rules.

The light emitting area PXL of the pixel PXb in the deformable region 300 may be located in the deformable region 300, and the first pixel circuit PXC1 and the second pixel circuit PXC2 connected to the light emitting area PXL may be generally located in the deformable region 300, or may be partially located in the adjacent non-deformable regions 100 and 200, as shown in FIG. 15.

Unlike as shown in FIG. 15, in another embodiment, both the light emitting area PXL of the pixel PXb and the first and second pixel circuits PXC1 and PXC2 connected thereto may be located in the deformable region 300.

Each pixel PXa, PXb may include pixels that can display light of different colors.

For example, each pixel PXa, PXb may display colors such as red, green, and blue.

Each pixel PXa, PXb may include a light emitting area PXL, which is an area capable of emitting light.

The light emitting area PXL may be defined by the opening 351 of the fifth insulating layer 350 described above.

Each light emitting diode ED including the pixel electrode 191 described above may be located in each light emitting area PXL.

As shown in FIG. 15, in case that the display device 1000 is unfolded, the image displayed by the light emitting area PXL of each pixel PXa, PXb may be the first image on the inner display surface exposed to the outside in case that the display device 1000 is unfolded. The first image may be displayed in a direction parallel to the third direction DR3, which is perpendicular to the direction DR1 and the second direction DR2.

In the non-deformable regions 100 and 200, each pixel PXa may include a pixel circuit PXC.

The pixel circuit PXC may be electrically connected to the light emitting diode ED of each pixel PXa and may transmit a data signal.

Each pixel PXb in the deformable region 300 may be the same as the pixel PXb described above, and may include multiple pixel circuits including a first pixel circuit PXC1 and a second pixel circuit PXC2.

In the deformable region 300, multiple pixel circuits included in each pixel PXb may be connected to a same signal line.

The connection relationship and repair method of the pixel electrode of the light emitting diode ED of each pixel PXb and the first and second pixel circuits PXC1 and PXC2 may be the same as described above, so detailed description thereof is omitted.

Referring to FIG. 16, in case that the deformable region 300 of the display device 1000 is bent and folded, the non-deformable region 100 may include an outer display surface 100A capable of displaying an image to the outside, and the non-deformable region 200 may also include an outer display surface 200A capable of displaying an image.

The deformable region 300 may also include an outer display surface 300A that can display an image externally in a bent state.

Deformable parts of the display device, such as the deformable region 300, may be subject to relatively greater stress than the non-deformable regions 100 and 200 due to repeated deformation, so defects may occur in the stacked layers, and the pixel circuit to which the light emitting diode is connected may become defective. However, according to the embodiment, multiple pixel circuits PXC1, PXC2 may be arranged in each pixel PXb, so even in case that a defect occurs in the pixel circuit to which the light emitting diode is initially connected, the circuit may be connected to another pixel circuit. Since the data signal may be received through the connected repair, display defects such as dark spots and bright spots may be resolved.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device, comprising a first display area including a plurality of pixels repeatedly arranged, wherein each of the plurality of pixels in the first display area comprises:

a light emitting diode including a pixel electrode;

a first pixel circuit; and a second pixel circuit adjacent to a side of the first pixel circuit, in at least one first pixel included in the plurality of pixels, the light emitting diode is electrically connected to the first pixel circuit and insulated from the second pixel circuit, and in the at least one first pixel, the first pixel circuit is electrically connected to a first connection part, the second pixel circuit is electrically connected to a second connection part, the pixel electrode is electrically connected to the first connection part and is electrically connected to a third connection part spaced apart from the first connection part, and the second connection part and the third connection part overlap each other in a plan view and are insulated from each other.

2. The display device of claim 1, wherein each of the plurality of pixels includes a first transistor and a second transistor connected to the first transistor, and the second transistor of the first pixel circuit included in each of the plurality of pixels and the second transistor of the second pixel circuit are connected to a same data line and a same scan line.

3. The display device of claim 2, wherein in at least one second pixel of the plurality of pixels, the light emitting diode is insulated from the first pixel circuit and electrically connected to the second pixel circuit.

4. The display device of claim 3, wherein in the at least one second pixel, the first pixel circuit is electrically connected to a first portion of a fourth connection part, the second pixel circuit is electrically connected to a fifth connection part, the pixel electrode is electrically connected to a second portion of the fourth connection part that is separated from and facing the first portion of the first connection part, and is electrically connected to a sixth connection part that is spaced apart from the fourth connection part, and the fifth connection part and the sixth connection part overlap each other in a plan view and are electrically connected to each other.

5. The display device of claim 4, wherein at least one of the fourth connection part, the fifth connection part, or the sixth connection part includes a metal.

6. The display device of claim 1, wherein at least one of the first connection part, the second connection part, or the third connection part includes a metal.

7. The display device of claim 1, further comprising:

a second display area including a plurality of pixels, wherein each of the plurality of pixels in the second display area includes a second light emitting diode and a third pixel circuit electrically connected to the second light emitting diode.

8. The display device of claim 7, further comprising:

a deformable region of which at least a part can be bent, and at least one non-deformable region connected to the deformable region, wherein the deformable region includes the first display area, and the at least one non-deformable region includes the second display area.

9. A display device, comprising:

a first portion that is deformable and a second portion that is connected to the first portion and is less deformable than the first portion, wherein the first portion includes a plurality of first pixels, the second portion includes a plurality of second pixels, each of the plurality of second pixels includes a first light emitting diode and a pixel circuit electrically connected to the first light emitting diode, each of the plurality of first pixels includes a second light emitting diode and a plurality of pixel circuits, and in each of the plurality of first pixels, the second light emitting diode is electrically connected to only one of the plurality of pixel circuits.

10. The display device of claim 9, wherein the plurality of pixel circuits included in each of the plurality of first pixels are connected to a same signal line.

11. The display device of claim 10, wherein each of the plurality of first pixels and the plurality of second pixels includes a first transistor and a second transistor connected to the first transistor, and the second transistor of the plurality of pixel circuits included in each of the plurality of first pixels is connected to a same data line and a same scan line.

12. The display device of claim 9, wherein each of the first and second light emitting diodes includes a pixel electrode, each of the plurality of pixel circuits included in each of the plurality of first pixels includes a first pixel circuit and a second pixel circuit adjacent to each other, and in at least one of the plurality of first pixels, the first pixel circuit is electrically connected to a first connection part, the second pixel circuit is electrically connected to a second connection part, the pixel electrode is electrically connected to the first connection part and a third connection part spaced apart from the first connection part, and the second connection part and the third connection part overlap each other in a plan view and are insulated from each other.

13. The display device of claim 12, wherein at least one of the first connection part, the second connection part, or the third connection part includes a metal.

14. The display device of claim 9, wherein each of the first and second light emitting diodes includes a pixel electrode, each of the plurality of pixel circuits included in each of the plurality of first pixels includes a first pixel circuit and a second pixel circuit adjacent to each other, and in at least one of the plurality of first pixels, the first pixel circuit is electrically connected to a first portion of a first connection part, the second pixel circuit is electrically connected to a second connection part, the pixel electrode is electrically connected to a second portion of the first connection part that is separated from and facing the first portion of the first connection part, and a third connection part that is spaced apart from the first connection part, and the second connection part and the third connection part overlap each other in a plan view and are electrically connected to each other.

15. The display device of claim 14, wherein at least one of the first connection part, the second connection part, or the third connection part includes a metal.

16. A repair method of a display device, comprising:

disconnecting, in the display device comprising a first display area including a plurality of pixels, wherein each of the plurality of pixels in the first display area includes a light emitting diode, a first pixel circuit, and a second pixel circuit adjacent to the first pixel circuit in the first display area, an electrical connection between the light emitting diode and the first pixel circuit, the light emitting diode including a pixel electrode, and in at least one first pixel included in the plurality of pixels the first pixel circuit is electrically connected to a first portion of a first connection part, the second pixel circuit is electrically connected to a second connection part, the pixel electrode is electrically connected to a second portion of the first connection part that is separated from and facing the first portion of the first connection part, and a third connection part that is spaced apart from the first connection part, and the second connection part and the third connection part overlap each other in a plan view and are electrically connected to each other; and electrically connecting the light emitting diode with the second pixel circuit, in at least one first pixel included in the plurality of pixels.

17. The repair method of a display device of claim 16, wherein each of the first pixel circuit and the second pixel circuit of the plurality of pixels includes a first transistor and a second transistor connected to the first transistor, and the second transistor of the first pixel circuit included in each of the plurality of pixels and the second transistor of the second pixel circuit are connected to a same data line and a same scan line.

18. The repair method of a display device of claim 17, further comprising:

using a laser, in the disconnecting of the electrical connection between the light emitting diode and the first pixel circuit and the electrically connecting of the light emitting diode with the second pixel circuit.

* * * * *